United States Patent Office 2,989,314
Patented June 20, 1961

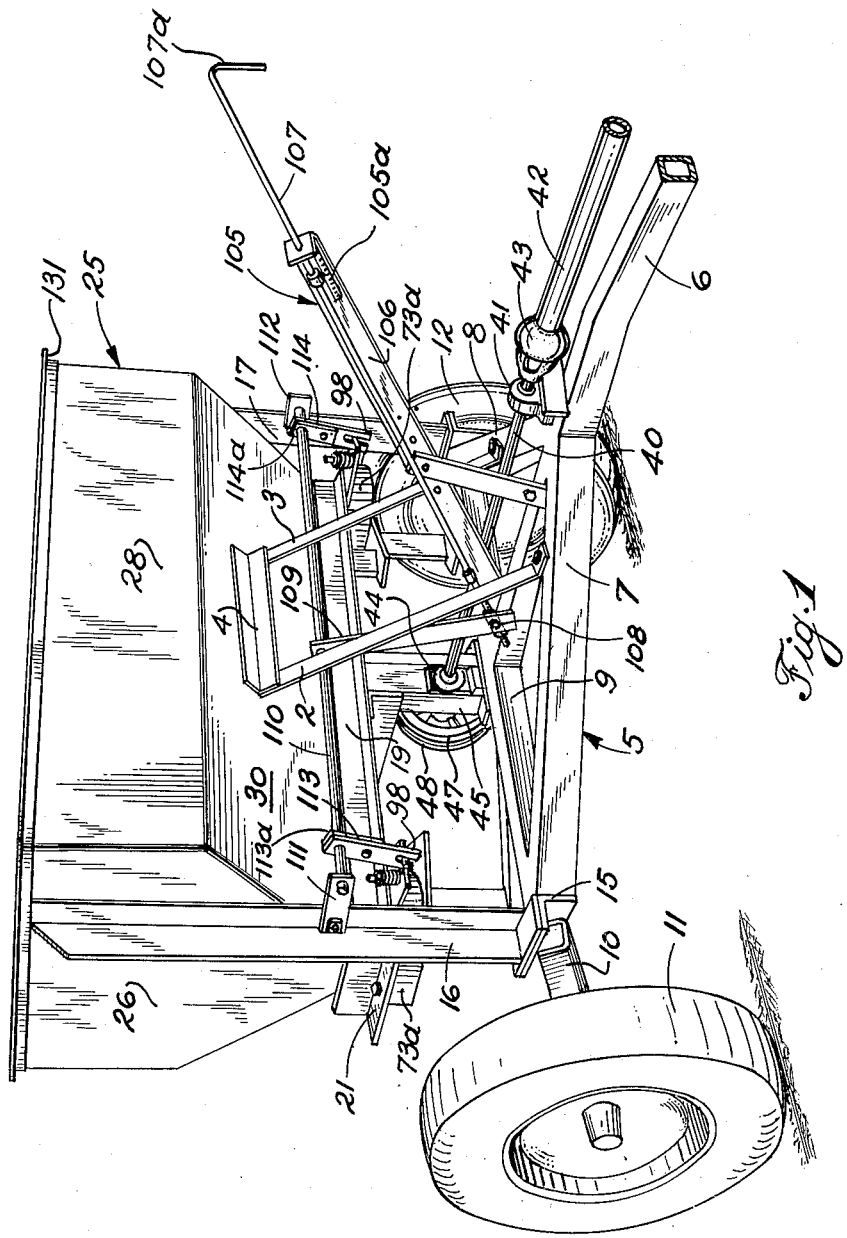

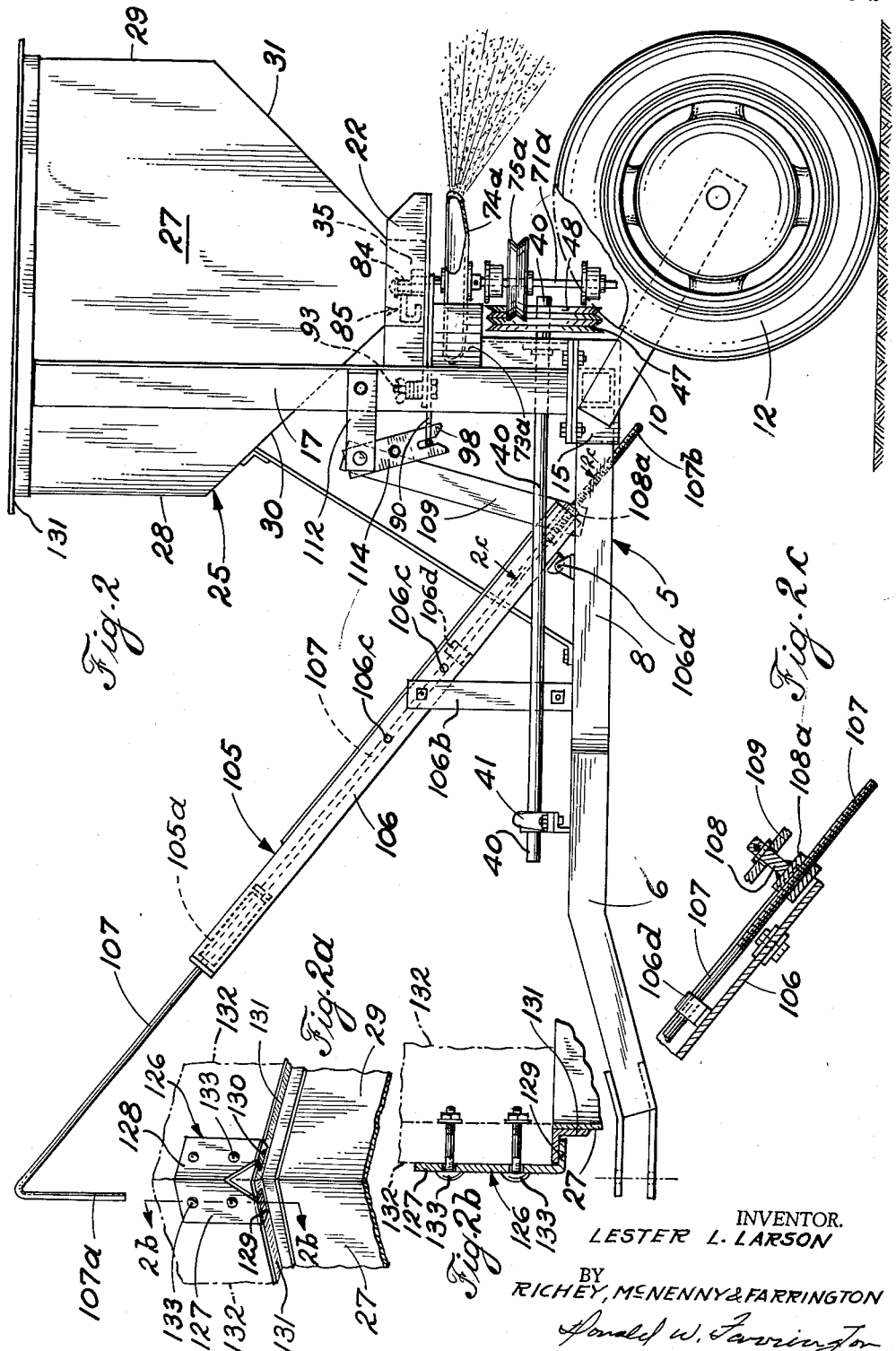

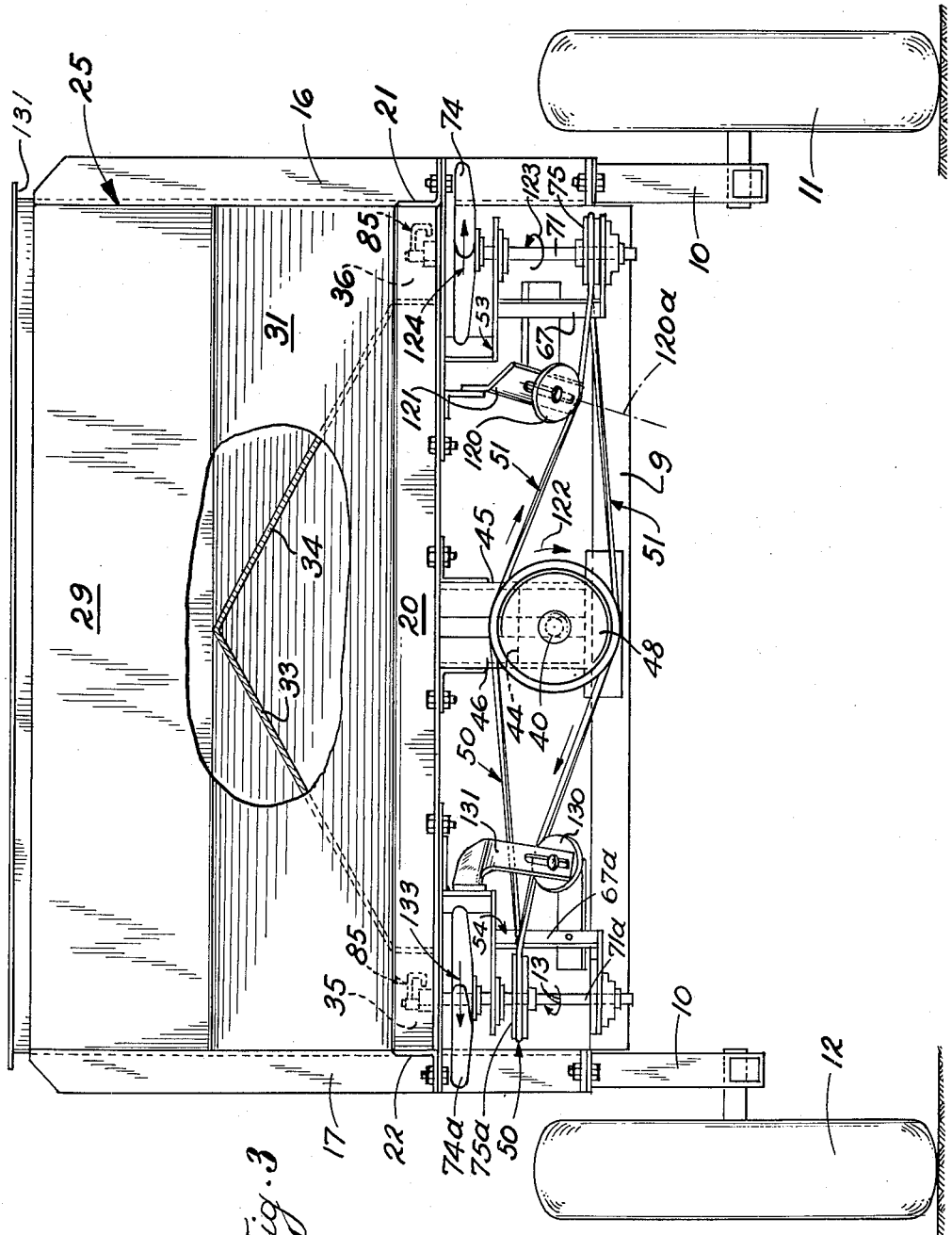

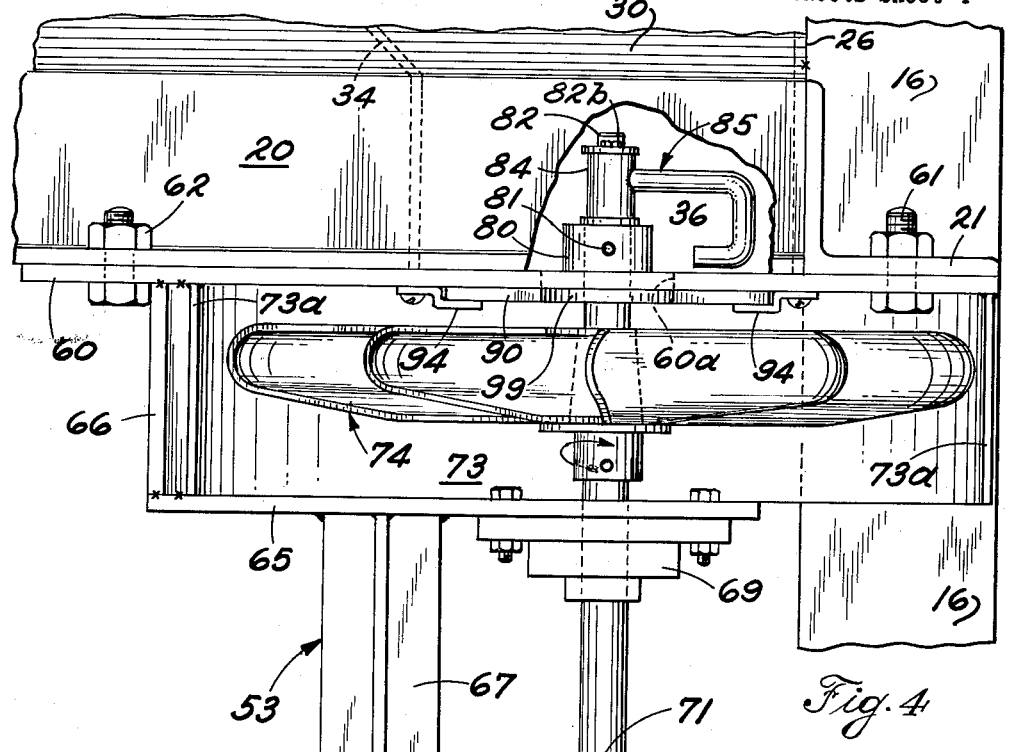
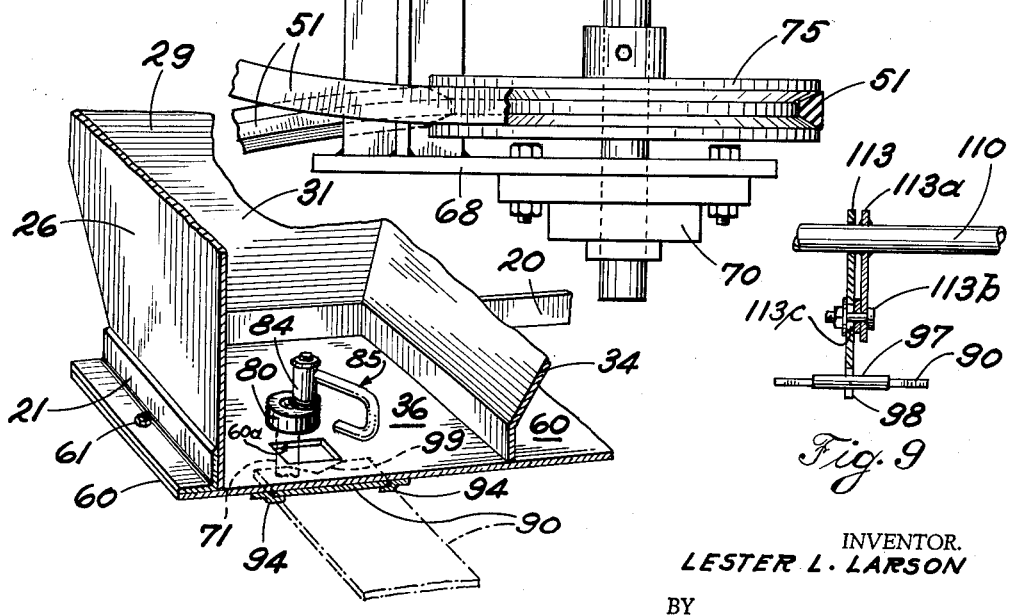

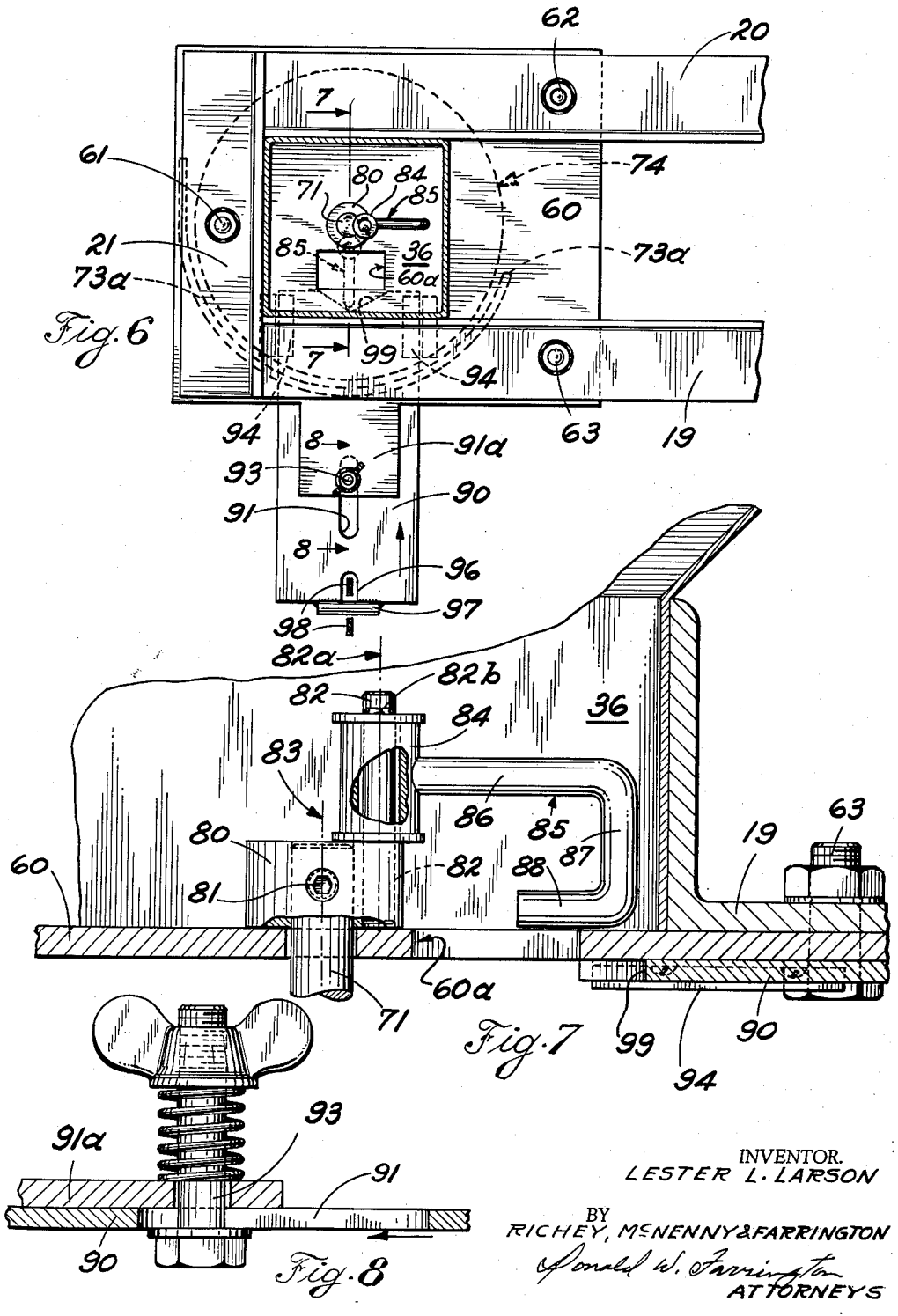

2,989,314
BROADCAST SPREADER
Lester L. Larson, Princeville, Ill.
Filed Jan. 6, 1959, Ser. No. 785,167
11 Claims. (Cl. 275—8)

My invention relates to a broadcast spreader and more particularly to a spreader suited for distribution of small grains and pelletized fertilizer products.

Current farming methods involve the transportation of the farm equipment for considerable distances over the highways and it has become increasingly difficult to transport the grain drills or seeding equipment heretofore employed because of the width of such equipment. The spreader made according to my invention is well adapted for construction in a width about eighty inches and thus may be easily transported through highway traffic behind a tractor or truck.

Prior art efforts to provide a broadcast spreader have included a throwing fan beneath a hopper opening and an agitator in the hopper. Since an efficient fan should rotate at about 1000 r.p.m., a separate low speed drive for the agitator was usually employed in the prior art devices. Rotating an agitator at fan speed produced cavitation of the material in the hopper and prevented even feeding of the material down onto the fan. According to my invention an agitator is driven at fan speed but the motion imparted thereto produces no cavitation in the material in the hopper. According to my invention no low speed drive is required for the agitator and yet even feeding is achieved.

My invention includes a two-wheeled vehicle constructed to support a hopper having a capacity of about fifteen cubic feet and includes feeding and broadcasting apparatus to spread the contents of the hopper over a width of about twenty-five to thirty-five feet depending upon the character of the material being spread.

It is among the objects of my invention to provide a two-wheeled vehicle adapted to be towed behind a tractor wherein the wheels are mounted with respect to the load carried by the vehicle so that the vehicle is biased to tilt toward the tractor and thus the tilting load is taken up by the drawbar for the vehicle.

It is a further object of my invention to provide a broadcast spreader according to the preceding object which is provided with a power take-off shaft running longitudinally of the vehicle and a pair of spaced rotary throwing devices, one throwing device being arranged at each side of the vehicle, and wherein an improved agitator is arranged to insure feeding of the contents of the hopper downwardly onto the throwing devices.

It is a further object of my invention to provide a broadcast spreader according to the preceding objects wherein the hopper carrying the material to be spread is provided with a pair of outlet openings spaced transversely of the vehicle and wherein a throttle or closure for the outlet openings may be conveniently manually controlled by the tractor operator.

It is a further object of my invention to provide a broadcast spreader having a hopper, a hopper chamber at the bottom of the hopper, a rotating shaft projecting vertically into the hopper chamber and wherein the shaft is provided on the end thereof projecting within the hopper chamber with an eccentric crank pin arranged to cause reciprocation of an agitator mounted on the crank pin.

It is a further object of my invention to provide a broadcast spreader according to the preceding object wherein the agitator within the hopper chamber includes a rotatable bearing on the crank pin and an arm extending laterally from the rotatable bearing across the hopper chamber and adjacent the outlet opening for the hopper chamber and wherein rotation of the projecting arm is restrained by the material in the hopper chamber and wherein the restraint against rotation of the arm results in reciprocation of the arm transversely of the shaft in the hopper chamber in a manner to loosen the material to be broadcast and cause the same to fall into the outlet opening.

Further objects and advantages relating to an improved drive for the agitator and throwing means and to economies in manufacture, ruggedness in construction and low cost of maintenance will appear from the following description and the appended drawings wherein:

FIG. 1 is a perspective view of a broadcast spreader made according to my invention;

FIG. 2 is a side elevation of the broadcast spreader;

FIG. 2a is a perspective view illustrating the application of side boards to the top of the hopper so as to increase the capacity of the hopper;

FIG. 2b is a sectional showing with parts broken away taken as indicated at 2b—2b of FIG. 2a;

FIG. 2c is a sectional view with parts broken away showing the adjusting means for controlling the feed opening at the bottom of the hopper;

FIG. 3 is a view from the rear of the broadcast spreader with parts broken away to show the hopper construction;

FIG. 4 is an elevation with parts broken away showing the throwing means mounted on a vertical shaft and the agitator carried by the shaft;

FIG. 5 is a perspective view with parts in section showing the agitator arranged within the hopper chamber and the slide arrangement for closing the outlet in the bottom of the hopper chamber;

FIG. 6 is a plan view with parts in section showing the bottom of the hopper chamber and the slide for controlling the outlet at the bottom of the hopper chamber;

FIG. 7 is an enlarged sectional elevation showing details of the agitator and its mounting in the bottom of the hopper chamber;

FIG. 8 is a sectional elevation of the tension arrangement for the slide controlling the outlet at the bottom of the hopper; and FIG. 9 is a sectional view showing the arrangement for adjusting one hopper slide relative to the other so as to accurately control the feeding of both hoppers.

Referring to the drawings, a supporting frame indicated in its entirety as at 5 is provided with a drawbar 6 and diverging frame members 7 and 8 secured to a transverse frame member 9. The drawbar extends rearwardly and is also secured to frame member 9. Each side of the frame 5 is equipped with a tubular wheel supporting strut member 10 extending rearwardly and downwardly to support the wheels 11 and 12. At each side of the frame 5 adjacent the tubular wheel supporting strut members 10 there is provided an angle iron 15 which is welded to the frame 5. The horizontal flange of the angle irons 15 support upright frame members 16 on the right-hand side of the vehicle and 17 on the left-hand side.

A pair of spaced horizontally disposed angle iron members 19 and 20 are supported by angle iron members 21 and 22 which are welded to the members 16 and 17, respectively. The members 21 and 22 extend horizontally from the uprights 16 and 17 in a cantilever fashion as best shown in FIG. 2.

A hopper indicated in its entirety as at 25 is supported by the frame work including the vertical members 16 and 17, the transverse angle iron members 19 and 20, and the members 21 and 22 carried by the upright members 16 and 17. Preferably the hopper is made of sheet metal and may be welded to the members 16 and 17 which bear against the end walls 26 and 27 of the hopper. The front and back walls 28 and 29, respectively, of the hopper 25 are sloped inwardly about half way down the height of the hopper to provide the sloping wall portions 30 and 31.

The bottom wall of the hopper 25 comprises oppositely sloping sections 33 and 34, as best shown in FIG. 3. The lower edge of the wall 33 terminates in a hopper chamber 35 at one end of the hopper 25 and the wall 34 terminates in a similar hopper chamber 36 at the other end of the hopper 25. The hopper chambers 35 and 36 are generally square as indicated in FIGS. 5 and 6 and have vertical walls corresponding in height to the height of the frame members 19 and 20 arranged at the bottom of the hopper structure.

The hopper chamber 36, which is located at the right-hand side of the broadcast spreader as viewed in FIG. 3, is shown in detail in FIGS. 5, 6 and 7, and it will be understood as the description proceeds that the left-hand hopper chamber 35 is similarly constructed and is provided with a similar agitator and throwing apparatus.

The power take-off drive for the broadcast spreader includes a shaft 40 mounted in a front bearing block 41 carried by the drawbar 6. The forward end of the shaft 40 is coupled to the power take-off shaft 42 by means of a universal joint coupling 43. A rear bearing block 44 is supported by spaced vertically disposed members 45 and 46 which are each secured to the frame member 9 at their lower ends and to the member 20 at their upper ends. The rear end of the shaft 40 has fixed thereto a pair of V-pulleys 47 and 48 which are adapted to drive the oppositely extending V-belts 50 and 51.

Beneath each of the hopper chambers 35 and 36 a fan and agitator drive assembly is arranged. The right-hand assembly as viewed in FIG. 3 is indicated in its entirety as at 53 and the left-hand assembly is indicated in its entirety as at 54. The assembly 53, best shown in FIG. 4, includes a welded structure comprising a flat plate 60 which is bolted to the underside of the hopper chamber 36 by means of bolts 61, 62 and 63. As shown in FIG. 6 the plate 60 is arranged so that bolts 61, 62 and 63 extend through the horizontal flanges of frame members 21, 20 and 19, respectively. A plate 65 is spaced beneath the plate 60 and is welded thereto by the vertically extending member 66. A vertically disposed strut member 67 is welded to plate 65 and carries at its lower end a third plate 68. The plates 65 and 68 carry the bearing blocks 69 and 70, respectively, to rotatably support the shaft 71 which projects upwardly through plate 60 into the hopper chamber 36.

The space between the upper side of plate 65 and the lower side of plate 60 forms a fan chamber 73 for the throwing fan 74 fixed to shaft 71. A pulley 75 is fixed to shaft 71 and, by means of the belt 51, the fan 74 is rotated at about 1000 r.p.m.

The upper end of shaft 71 projects through an opening in the plate 60 approximately in the center of the hopper chamber 36. A collar 80 is secured to the upper end of shaft 71 by means of a locking screw 81 and said collar carries a pin 82 eccentric of the axis 83 of the shaft 71. A sleeve 84 is mounted for rotation on the pin 82 and has fixed thereto an agitator indicated in its entirety as at 85. The agitator includes an upper horizontal portion 86 welded, or otherwise secured, to the sleeve 84, a down-turned end portion 87 and an inwardly turned bottom section 88.

The motion of the agitator 85 is a combined reciprocating and rotary motion. It will be understood that whenever the agitator 85 is restrained against rotation about the axis 83, the eccentricity between the axis 83 and the axis 82 of the pin 82 will cause the agitator to reciprocate toward and away from the axis 83.

An opening 60a is formed in plate 60 adjacent the shaft 71 and the agitator 85 operates to loosen the contents in the hopper 36 and maintain a continuous feeding action of the material to be broadcast downwardly through the opening 60a.

Referring particularly to FIGS. 6 and 7, it will be understood that in the absence of any grain or other material in the hopper chamber 36, centrifugal force will cause the agitator 85 to swing bodily around the axis 83 at 1000 r.p.m. in the event the shaft 71 is being driven at 1000 r.p.m. When, however, grain or pelletized fertilizer material is in the hopper chamber 36, the bodily rotation of the agitator 85 about the axis 83 is retarded. This bodily rotation of the agitator is not entirely prevented inasmuch as the reciprocation of the agitator toward and away from the axis 83 reduces the resistance of the grain or other material immediately adjacent the agitator. Thus the agitator 85 may rotate bodily about the axis 83 ten or fifteen revolutions per minute even though the shaft 71 is being driven at 1000 r.p.m. This means that during the same period of time (one minute) the agitator has reciprocated toward and away from the axis 83 nine hundred and eighty-five times. The difference between the bodily rotation per minute and the reciprocation (per minute) toward and away from the axis 83 will vary somewhat depending upon the density of the material being fed downwardly through the opening 60a. It will be understood that denser grains, such as flax and wheat, will impose a greater resistance to bodily rotation of the agitator than other grains. Accordingly it will be understood that the conversion of rotation in the shaft 71 to reciprocating motion of the agitator 85 will be automatically varied in response to the density of the different materials being broadcast.

The slow rotation of the agitator prevents cavitation and insures fast, even feed through the outlet 60a down onto the fan 74. The fan 74 includes curved blades designed to efficiently scatter and throw the materials in a wide path in back of the spreader. I have found 1000 r.p.m. to be an efficient speed for the rotation of the fan 74 and the rate at which the materials to be broadcast is fed downwardly through the opening 60a may be controlled by a throttle plate 90. As illustrated in FIGS. 5 and 6, the plate 90 is slotted as at 91 on its forward end and rides on brackets 94 at its rearward end. The slot 91 receives a spring-biased bolt 93. Lug 91a carried by the plate 60 along with brackets 94 supports the slide 90. The tension on the slide may be adjusted by the thumb nut on bolt 93. The forward end of the plate 90 is provided with an opening 96 and a pin 97 is welded to the plate 90 across the end of the opening 96 so as to receive a fork 98 of a slide actuator. That portion of the slide 90 adjacent the opening 60a is notched as indicated at 99 in FIGS. 5 and 6. By moving the slide 90 as limited by the slot 91, the feed opening 60a in the bottom of the hopper chamber 36 may be completely closed. The movement of the slide 90 in a direction to open the outlet of the hopper 36 provides the maximum feeding of the broadcast material downwardly against the fan 74.

Preferably the forward part of the fan chamber 73 is closed by a fan guard 73a. The guard confines fan discharge to about 180° around the periphery of the fan chamber.

The opening and closing of the feed opening 60a is conveniently controlled by the operator of the tractor or towing vehicle by the actuating mechanism indicated in its entirety as at 105.

A bar 106 is pivotally carried on the frame 5 by means of the bracket connection 106a (see FIG. 2). The angularity of the bar 106 with respect to the frame 5 is determined by means of the bracket 106b. The upper end of the support 106b may be bolted to the bar 106 at any of the openings in the bar 106 indicated at 106c. The purpose of this flexible connection or mounting of the bar 106 is to arrange the operating handle 107a at a convenient elevation for manual control by the operator of the towing tractor. The control rod 107 is slidably mounted on the bar 106. The mounting of the rod 107 at the upper end of the bar 106 is by means of the in-turned end of the bar whereby the rod 107 slides therethrough. The lower end of the rod 107 is slidably mounted in a bracket 106d (FIG. 2c). The lower end of the control rod 107 is threaded to receive the internally threaded sleeve 108a to which is fixed a laterally extending pin 108. The pin 108 is received in an opening at the lower end of a lever 109 which is welded at its upper end to the transverse shaft 110.

A bracket 111 at the right-hand side of the spreader pivotally mounts one end of the transverse bar 110 and a similar bracket 112 at the other end of the spreader pivotally supports the other end of the bar 110 for rocking movement. An adjustable control assembly is carried at each end of the shaft 110. As shown in FIG. 9 a depending lever 113a is welded to the shaft 110 and a depending lever 113 is freely mounted for rotation on the shaft 110 alongside of the plate 113a. The lower end of the plate 113a carried a transverse bolt 113b which extends through an enlarged opening 113c on the lever 113. The lower end of the member 113 carries the fork portion 98 to embrace the pin 97 carried by the slide 90. By loosening the nut on the bolt 113b, the lever 113 may be moved within the limits provided by the enlarged opening 113c and the nut thereafter tightened so as to accurately adjust the position of the slide in relation to the rocking shaft 110.

The bar 106 is provided at its upper end with an indicia plate 105a and an indicator is carried by the rod 107 adjacent the indicia plate so as to show the position of the rod along the supporting bar 106. The indicia plate may be marked off by numerals such as 1 to 6 with the number 1 being lowermost on the scale and thus showing a smaller opening at the bottom of the hopper chambers. When the rod 107 is then pulled to its uppermost position with the indicator located at 6, the maximum opening will be provided in the bottom of the hopper chamber. The openings in the bottom of the hopper chambers are related to the speed at which the spreader is being towed. For example, if the opening in the bottom of the hopper is restricted so as to spread 160 pounds of grain per acre at one mile per hour, the same opening would only spread 23 pounds per acre at seven miles per hour. Thus the operator of the spreader may relate the speed at which he tows the spreader to the setting of the slide opening to control exactly the quantity of material being spread. By turning the rod 107 it may be threaded in or out of the threaded sleeve 108a so as to vary the opening and closing points on the slide 90 controlling the feed at the bottom of each of the hopper chambers.

In the event the spreader is being used for light materials and it is desired to increase the capacity of the hopper 25, corner brackets such as the bracket 126 shown in FIGS. 2a and 2b may be employed. Each corner bracket 126 includes wings 127 and 128 at right angles to each other. The wing 127 is provided with an inturned flange 129 at its lower end. Similarly the lower edge of the wing 128 is provided with an inturned flange 130. The inturned flanges 129 and 130 are arranged to fit beneath the flange 131 which runs around the top of the hopper 25. Side boards 132 of any desired height are arranged to rest on the upper surface of the flange 131 running from the top of the hopper. The side boards are cut to form a rectangular frame and the frame is retained in position on the top of the hopper by transverse bolts 133 extending through the wings 128 and 127 and thence through the side boards 132. When brackets such as 126 are secured to the frame work of side boards 132, the side boards are securely fastened to the hopper and effectively increase the capacity of the hopper.

The assembly 54 at the left-hand side of the broadcast spreader corresponds substantially to the assembly 53 described above in connection with the feeding and throwing means for the hopper chamber 36. The assembly at the left-hand side, however, includes a driving pulley 75a at a higher elevation along the vertical shaft than the corresponding pulley 75 at the right-hand side of the spreader. The difference in elevation between the pulleys 75 and 75a is to facilitate the drive of the vertical shafts by means of the V-belts 50 and 51.

As will be observed from FIG. 3 of the drawings, a belt tightener pulley 120 is carried by a bracket 121 so as to cause the pulley to bear against the back of the V-belt 51 as it comes off the top of the driving pulley 48. The axis of the belt tightener pulley 120 is indicated at 120a and the pulley 120 is thus tilted by the bracket 121 to turn the belt 51 feeding onto the right-hand drive pulley 75. The belt 51 is thus twisted or turned 90° between the pulley 48 and the pulley 75. Assuming the pulley 48 on the power take-off shaft 40 is driven in the direction indicated by the arrow 122, the shaft 71 will be rotated as indicated by the arrow 123 and the fan 74 will move as indicated by arrow 124, thus throwing the grain, or the like, over a wide path including an area to the right of the broadcast spreader.

At the left-hand side of the broadcast spreader a belt tightener pulley 130 is carried by a bracket 131 and is arranged to bear against the back of V-belt 50 as it comes off of the pulley 47. The axis of the pulley 130 is also tilted so as to twist or turn the belt 50 between the two pulleys 47 and 75a. Accordingly the shaft 71a in the left-hand assembly 54 is rotated in the direction of arrow 132 and the fan 74a moves in the direction indicated by the arrow 133 to throw the grain to be broadcast in a wide path including an area to the left of the broadcast spreader.

It is among the advantages of the driving mechanism for the fan and agitator described above that the assemblies 53 and 54 may be quickly and easily removed as a unit. Removal of the three bolts 61, 62 and 63 will permit the assembly 53 to be lowered away from the underside of the hopper. Accordingly the fan, pulleys, belts, agitator and throttle slide 90 may be easily and quickly serviced by this unitary construction.

It is a further advantage of the assemblies 53 and 54 that belt replacement is facilitated by the single outboard support 67 for the shaft 71 in the bearing block 70. The hopper 25 is braced by bars 2 and 3 running from the frame members 7 and 8 up to angle iron 4 welded to the wall 30.

It will be observed that the vertical side walls of the hopper chambers 35 and 36 are proportioned to slightly exceed the height of the agitator assembly 85 which operates in each of the chambers. The vertical side walls restrain motion of the material being spread away from the agitator 85. It will also be noted from FIG. 7 that the agitator sleeve or bearing 84 has a loose fit on the pin 82. This construction is useful particularly in connection with the handling of pelletized fertilizer. I have found that the loose fit between the pin 82 and the sleeve 84 results in keeping the sleeve free for rotation relative to the pin 82.

It will be understood by reference to FIG. 2 that the center of gravity of the load in the hopper 25 is forwardly of the axis of rotation of the wheel 12. The center of gravity of the load, however, is close to the axis of wheel rotation and thus the attachment of the drawbar 6 to the towing tractor is facilitated. Inasmuch as the center mass is forwardly of the wheel axis, the spreader will not tip over rearwardly or tend to swing the towbar 6 upwardly. Preferably the frame is constructed so that the wheels 11 and 12 are about 80 inches apart and, with the arrangement shown and described above, a distribution path about 35 feet wide may be obtained with most grains. It will be understood that the opening at the bottom of each of the hopper chambers 35 and 36 should be adjusted in accordance with the speed at which the spreader is moved over the ground to obtain the correct distribution.

Although I have shown and described one form of my invention in considerable detail, it will be understood by those skilled in the art that numerous modifications may be made therein without departing from the scope of the invention as defined in the following claims:

What is claimed is:

1. A broadcast spreader comprising a frame, a member secured at each side of the frame and extending downwardly and rearwardly of the frame, supporting wheels journalled at the lower end of said members, a vertically disposed member at each side of the frame, an elongated hopper supported between said two vertical members, said hopper having vertical wall portions near the top of the hopper, sloping front and back walls near the bottom of said hopper, a bottom wall for the hopper having oppositely downwardly sloping sides terminating near opposite ends of the hopper in a hopper chamber, said hopper chamber having vertical side walls, a vertically disposed shaft supported by the frame and arranged to project upwardly into each of said hopper chambers, the top of said vertically disposed shaft terminating below the upper edges of said vertical walls on the hopper chamber, an outlet opening formed in the bottom of the hopper chamber adjacent said vertical shaft, a fan for throwing materials to be broadcast fixed to said vertical shaft beneath said hopper chamber outlet, a pulley on said shaft beneath the fan and an agitator carried by the shaft in the hopper chamber above the fan, said agitator including an eccentric crank to reciprocate the agitator in the hopper chamber adjacent said outlet, a power take-off shaft journalled centrally of said frame and having a pair of pulleys fixed at one end of said power take-off shaft, a belt extending from one of said pulleys to one side of the spreader and operatively driving one of said vertical shafts, a second belt arranged on the other of said pulleys and extending to the other side of the spreader and operatively connected to the other of said vertical shafts.

2. A broadcast spreader comprising a triangular frame having a drawbar extending from one corner of said triangular frame, a pair of spaced supporting wheels secured near the other two corners of said triangular frame, one upright secured to a corner of the triangular frame near one wheel and another upright being secured to the corner of the triangular frame near said other wheel, a pair of transverse frame members carried by said vertical uprights intermediate the ends of said uprights, a hopper mounted between said uprights, said hopper having sloping front and back walls terminating between said transverse members, said hopper having a bottom wall with oppositely sloping portions terminating at each side of the hopper in a hopper chamber, means for feeding and throwing material discharged from said hopper chambers transversely of the spreader comprising a horizontal plate across the bottom of each of said hopper chambers, said horizontal plate having a feed opening, a vertical shaft extending into the hopper chamber adjacent said feed opening, a fan secured to said vertical shaft beneath the feed opening and a reciprocating agitator mounted on said shaft within the hopper chamber above said feed opening, a bearing at the lower end of said vertical shaft, a strut depending from said hopper parallel to said vertical shaft to support said bearing, a power take-off shaft journalled on said triangular frame and having a portion thereof projecting beyond the frame beneath the center of said hopper, belts operatively connecting said projecting portion of said power take-off shaft and the vertical shafts for driving said fans and agitators, said depending strut being disposed between the vertical shaft and said power take-off shaft and being located in the space between the two sides of the belt coming from said vertical shaft.

3. A broadcast spreader comprising a tubular metal frame, tubular strut members welded at one end thereof at each side of the frame and extending downwardly and rearwardly of the frame, supporting wheels journalled at the lower end of said strut members, a vertically disposed angle iron welded at each side of the frame, an elongated metal hopper supported between said two vertical angle irons, said hopper having vertical wall portions at each end welded to said angle irons, sloping front and back walls near the bottom of said hopper, a bottom wall for the hopper arranged between said sloping walls and having oppositely downwardly sloping sides terminating near opposite ends of the hopper in a hopper chamber, a vertically disposed shaft supported by the frame and arranged to project upwardly into each of said hopper chambers, an outlet opening formed in the bottom of the hopper chamber adjacent said vertical shaft, a fan for throwing materials to be broadcast fixed to said vertical shaft beneath said hopper chamber outlet, a pulley on said shaft beneath the fan and an agitator carried by the shaft in the hopper chamber above the fan, said agitator including an eccentric crank pin on the shaft, a sleeve on the crank pin and an arm extending from the sleeve in the hopper chamber adjacent said outlet, a power take-off shaft carried by said frame and having a pair of pulleys fixed thereto, belts extending from said pulleys to opposite sides of the spreader and operatively driving said vertical shafts, and means to support said vertical shaft comprising a vertical strut parallel to the shaft and arranged within the space between the sides of the belt coming from the pulley on the vertical shaft.

4. A broadcast spreader comprising a two-wheeled vehicle frame, a hopper mounted on the frame having sloping wall portions terminating in a hopper chamber at the bottom of the hopper, a feeding and throwing unit mounted beneath said hopper chamber comprising a horizontal first plate removably mounted on the frame beneath the hopper chamber, said plate having a vertical shaft opening therein and a square feed opening adjacent the shaft, a notched closure slidably mounted on the underside of said plate beneath the opening for controlling the size of the feed opening, a second plate carried by said first plate and spaced therebeneath to provide a fan chamber between said plates, a shaft bearing on said second plate, a third plate spaced from said second plate beneath said second plate, means to support said third plate comprising a strut depending from the second plate and extending normally therefrom, a shaft bearing in said third plate, a vertical shaft extending through the opening in said first plate and being supported for rotation at spaced points along its length by said bearings, a belt pulley fixed to said shaft between said second and third plates, a belt on said pulley, said strut being within the space defined by the sides of the belt coming from said pulley to facilitate belt replacement.

5. A broadcast spreader comprising a hopper having a hopper chamber at the bottom thereof, said hopper chamber having a flat horizontal bottom and vertically disposed side walls, a rotating shaft projecting upwardly into the hopper chamber, an agitator secured to the top of said shaft, an opening in the bottom of the hopper chamber near the shaft, said agitator comprising a crank pin eccentric of the axis of the shaft and parallel thereto, the top of said crank pin terminating beneath the top edges of said vertical side walls of the chamber, a sleeve surrounding the crank pin and rotatably mounted on said crank pin and a bar extending laterally from the sleeve, said bar being rotatable about said crank pin and about the axis of said shaft, whereby the bar is reciprocated in response to rotation of said shaft and in response to rotation imposed on the bar by the material in the hopper chamber.

6. A broadcast spreader comprising a hopper having sloping wall portions terminating in a hopper chamber at the bottom of the hopper, a feeding and throwing assembly mounted beneath said hopper chamber, said assembly comprising a horizontal first plate removably attached to the hopper beneath the hopper chamber, said plate having a shaft opening therein and a feed opening adjacent the shaft, a closure slidably mounted on the underside of said plate for controlling the feed opening, a second plate carried by said first plate and spaced therebeneath to provide a fan chamber between said first and second plates, a third plate parallel to and spaced beneath said second plate, support means secured to said second plate and depending therefrom to support said third plate, a vertical shaft extending through the opening in said first plate and being supported for rotation at spaced points along its length by bearings in said second and third plates, a belt pulley fixed to said vertical shaft between said second and third plates, an endless belt arranged around said pulley and said support means with the support means being adjacent the periphery of the pulley and spaced from opposite sides of the belt, an agitator fixed to the end of said vertical shaft in said hopper, a depending hook mounted eccentrically of said agitator shaft arranged to reciprocate in response to rotation of the shaft adjacent the floor of the hopper and adjacent said feed opening.

7. A broadcast spreader comprising a hopper having a hopper chamber at the bottom thereof, said hopper chamber having a flat horizontal bottom, a rotating shaft projecting upwardly into the hopper chamber, an agitator secured to the top of said shaft, an opening in the bottom of the hopper chamber near the shaft, said agitator comprising a crank pin eccentric of the axis of the shaft and parallel thereto, a sleeve surrounding the crank pin and rotatably connecting said agitator to said shaft, a bar extending laterally from the sleeve a spaced distance above the bottom of the hopper chamber, said bar being rotatable about said crank pin and about the axis of said shaft, said bar having a depending portion at the end thereof away from said sleeve, said bar having a projecting portion extending horizontally inward toward said shaft from the lower end of said depending portion, said projecting portion extending adjacent the bottom of said hopper chamber to sweep across said opening.

8. A broadcast spreader comprising a hopper having a hopper chamber at the bottom thereof, said hopper chamber having a flat horizontal bottom and vertically disposed side walls, a rotating shaft projecting upwardly into the hopper chamber, an agitator secured to the top of said shaft, an opening in the bottom of the hopper chamber near the shaft, said agitator comprising a crank pin eccentric of the axis of the shaft and parallel thereto, the top of said crank pin terminating beneath the top edges of said vertical side walls of the chamber, a sleeve surrounding the crank pin and rotatably mounted on said crank pin, a bar extending laterally from the sleeve a spaced distance above the bottom of said hopper chamber, said bar being rotatable about said crank pin and about the axis of said shaft, said bar having a depending portion extending downwardly from the end thereof away from said sleeve, said bar having a projecting portion extending horizontally inward toward said shaft from the lower end of said depending portion, said projecting portion extending adjacent the bottom of said hopper chamber to sweep across said opening.

9. A broadcast spreader comprising a two wheeled vehicle frame, a hopper mounted on the frame having sloping wall portions terminating in a hopper chamber at the bottom of the hopper, a feeding and throwing unit mounted beneath said hopper chamber comprising a first plate removably mounted on the frame beneath the hopper chamber, said first plate having a vertical shaft opening therein and a feed opening adjacent the shaft, a closure member slidably mounted on the under side of said plate beneath the opening for controlling the size of the feed opening, a second plate carried by said first plate and spaced therebeneath to provide a fan chamber between said plates, a shaft bearing on said second plate, a third plate spaced from said second plate beneath said second plate, means to support said third plate comprising a strut depending from said second plate and extending downwardly therefrom, a shaft bearing in said third plate, a vertical shaft extending through the opening in said first plate and being supported for rotation at spaced points along its length by said bearings, the upper end of said shaft extending into said hopper chamber, a fan for throwing material to be broadcast fixed to said vertical shaft in said fan chamber, a belt pulley fixed to said shaft between said second and third plates, and a belt on said pulley, said strut being within the space defined by the sides of the belt coming from said pulley to facilitate belt replacement.

10. A broadcast spreader comprising a hopper having sloping wall portions terminating in a hopper chamber at the bottom of the hopper, said hopper chamber having vertical side walls, a feeding and throwing assembly mounted beneath said hopper chamber, said assembly comprising a first plate removably attached to the hopper beneath the hopper chamber, said first plate having a shaft opening therein and a feed opening adjacent the shaft opening, a closure slidably mounted on the underside of said first plate for controlling the feed opening, a second plate connected to said first plate and spaced therebeneath to provide a fan chamber between said first plate and said second plate, a third plate spaced beneath said second plate, support means connected to said second plate and depending therefrom to support said third plate, a vertical shaft extending through the opening in said first plate and being supported for rotation at spaced points along its length by bearings in said second and third plates, a belt pulley fixed to said vertical shaft between said second and third plates, an endless belt arranged around said pulley and said support means with the support means being adjacent the periphery of the pulley and spaced from opposite sides of the belt, said vertical shaft extending upward above the bottom of said hopper chamber, an agitator fixed to the end of said vertical shaft below the top of said hopper chamber, said agitator being driven by the rotation of the shaft to direct material in the hopper chamber into said feed opening.

11. A broadcast spreader comprising a two wheeled vehicle frame, an elongated hopper mounted on the frame, said hopper having sloping wall portions terminating in a hopper chamber adjacent each end of said hopper at the bottom thereof, a feeding and throwing unit for each hopper chamber mounted beneath said hopper adjacent each hopper chamber, each of said feeding and throwing units comprising, a first plate removably mounted on the frame beneath the hopper chamber, said first plate having a vertical shaft opening therein and a feed opening adjacent the shaft opening, a closure member slidably mounted on the underside of said first plate beneath the feed opening for controlling the size of the feed opening, a second plate carried by each said first plate and spaced therebeneath to provide a fan chamber between said first and second plates, a shaft bearing on said second plate, a third plate spaced from said second plate beneath said second plate, means to support said third plate comprising a strut depending from the second plate and extending downwardly therefrom, a shaft bearing in said third plate, a vertical shaft extending through said shaft opening in said first plate and being supported for rotation at spaced points along its length by said bearings, a belt pulley fixed to each vertical shaft between said second and third plates, a horizontal power shaft journaled on said frame between said feeding and throwing units, two pulleys mounted on said power shaft, a belt on each vertical shaft pulley connected to one of the pulleys on said power shaft, each of said struts being within the space defined by the belt coming from said vertical shaft pulley to facilitate belt replacement, a feed control shaft extending lengthwise of said hopper and mounted for oscillation about its axis, said feed control shaft being operatively connected to each of said closure members to simultaneously move said closure members in response to oscillation of said feed control shaft, and a manually operable rod mounted on the frame for reciprocating movement, means connecting the manually operable rod and said feed control shaft to oscillate the shaft and vary the effective area of the feed opening.

References Cited in the file of this patent

UNITED STATES PATENTS

| | | |
|---|---|---|
| 280,437 | Armstrong | July 3, 1883 |
| 1,211,596 | Kindt | Jan. 9, 1917 |
| 1,655,780 | Brininger | Jan. 10, 1928 |
| 2,299,565 | Colburn | Oct. 20, 1942 |
| 2,535,414 | Heidger | Dec. 26, 1950 |
| 2,594,084 | Skibbe | Apr. 22, 1952 |
| 2,672,259 | Hobgood | Mar. 16, 1954 |
| 2,698,184 | Bowen | Dec. 28, 1954 |

FOREIGN PATENTS

| | | |
|---|---|---|
| 236,400 | Great Britain | July 9, 1925 |